US009643581B2

(12) United States Patent
Yang

(10) Patent No.: US 9,643,581 B2
(45) Date of Patent: *May 9, 2017

(54) ELECTRIC BRAKE SYSTEM

(71) Applicant: MANDO CORPORATION, Gyeonggi-do (KR)

(72) Inventor: I-Jin Yang, Seongnam-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/963,210

(22) Filed: Dec. 8, 2015

(65) Prior Publication Data

US 2016/0159332 A1 Jun. 9, 2016

(30) Foreign Application Priority Data

Dec. 9, 2014 (KR) ........................ 10-2014-0175622

(51) Int. Cl.
*B60T 13/14* (2006.01)
*B60T 7/04* (2006.01)
(Continued)

(52) U.S. Cl.
CPC ............ *B60T 13/142* (2013.01); *B60T 7/042* (2013.01); *B60T 8/348* (2013.01); *B60T 8/4018* (2013.01);
(Continued)

(58) Field of Classification Search
CPC ...... B60T 13/142; B60T 7/042; B60T 8/4086; B60T 13/686; B60T 8/348; B60T 13/746;
(Continued)

(56) References Cited

U.S. PATENT DOCUMENTS 6,899,403 B2   5/2005 Isono et al.
8,226,176 B2 * 7/2012 Hatano ................. B60T 8/4081
                                                         303/115.2

(Continued)

FOREIGN PATENT DOCUMENTS

JP    2005-343366    12/2005
JP    2009-143302    7/2009
(Continued)

OTHER PUBLICATIONS

Notice of Allowance dated Mar. 31, 2016 for Korean Patent Application No. 10-2014-0175622 and its English summary provided by Applicant's foreign counsel.
(Continued)

*Primary Examiner* — Thomas J Williams
*Assistant Examiner* — Mariano Sy
(74) *Attorney, Agent, or Firm* — Ladas & Parry, LLP

(57) ABSTRACT

An electric brake system includes a reservoir, a master cylinder including first and second hydraulic ports, a simulation device providing reaction force in response to foot force applied to a brake pedal, a hydraulic-pressure supply device, a hydraulic-pressure control unit, and an electronic control unit (ECU). The hydraulic-pressure supply device converts rotational force of a motor into rectilinear motion upon receiving an electric signal from the pedal displacement sensor, and moves a double-acting piston designed to perform reciprocating motion within a hydraulic cylinder. The double-acting piston moves in both directions such that the first hydraulic chamber located at one side or the second hydraulic chamber located at the other side are pressed, resulting in formation of hydraulic pressure.

10 Claims, 6 Drawing Sheets

(51) Int. Cl.
    *B60T 13/68*     (2006.01)
    *B60T 13/66*     (2006.01)
    *B60T 13/74*     (2006.01)
    *B60T 8/34*     (2006.01)
    *B60T 8/40*     (2006.01)

(52) U.S. Cl.
    CPC .......... *B60T 8/4081* (2013.01); *B60T 13/146* (2013.01); *B60T 13/662* (2013.01); *B60T 13/686* (2013.01); *B60T 13/746* (2013.01)

(58) Field of Classification Search
    CPC ...... B60T 8/4081; B60T 8/409; B60T 13/146; B60T 13/662; B60T 8/4018
    USPC ...................................... 303/15, 113.4, 119.1
    See application file for complete search history.

(56) References Cited

U.S. PATENT DOCUMENTS

| | | | | |
|---|---|---|---|---|
| 8,840,199 | B2* | 9/2014 | Hatano | B60T 8/4081 |
| | | | | 303/113.1 |
| 8,944,526 | B2* | 2/2015 | Nishioka | B60T 7/042 |
| | | | | 303/14 |
| 8,991,941 | B2* | 3/2015 | Gotoh | B60T 8/4081 |
| | | | | 303/116.1 |
| 9,050,956 | B2* | 6/2015 | Hotani | B60T 8/4081 |
| 9,109,613 | B2* | 8/2015 | Ito | F15B 15/00 |
| 9,162,660 | B2* | 10/2015 | Koo | B60T 13/686 |
| 2012/0091787 | A1 | 4/2012 | Nishino et al. | |
| 2012/0161506 | A1* | 6/2012 | Tanaka | B60T 13/745 |
| | | | | 303/14 |
| 2013/0214587 | A1* | 8/2013 | Yang | B60T 13/686 |
| | | | | 303/6.01 |
| 2015/0082979 | A1* | 3/2015 | Nakamura | B60T 8/368 |
| | | | | 92/169.1 |
| 2016/0159331 | A1* | 6/2016 | Yang | B60T 13/142 |
| | | | | 303/15 |

FOREIGN PATENT DOCUMENTS

| | | |
|---|---|---|
| JP | 4792416 | 7/2011 |
| JP | 2012-131393 | 7/2012 |
| JP | 2012-214092 | 11/2012 |
| KR | 10-2013-0104160 | 9/2013 |

OTHER PUBLICATIONS

Office Action dated Aug. 28, 2015 for Korean Patent Application No. 10-2014-0175622.

* cited by examiner

US 9,643,581 B2

ELECTRIC BRAKE SYSTEM

CROSS-REFERENCE TO RELATED APPLICATION

This application claims the priority to Korean Patent Application No. 10-2014-0175622, filed on Dec. 9, 2014 in the Korean Intellectual Property Office, the disclosure of which is incorporated herein by reference in its entirety.

BACKGROUND

1. Field

Embodiments of the present invention relate to an electric brake system which has a simplified structure and allows precise pressure control.

2. Description of the Related Art

A brake system for braking of a vehicle is essentially mounted on a vehicle, and various systems have recently been proposed to obtain stronger and more stable braking force. Examples of brake systems include anti-lock brake systems (ABSs) to prevent slippage of wheels during braking, brake traction control systems (BTCSs) to prevent slippage of driving wheels during rapid acceleration from a stop or upon sudden acceleration of a vehicle, and vehicle dynamic control systems (VDCs) to stably maintain a driving state of vehicles by controlling a brake hydraulic pressure through a combination of an anti-lock brake system with a brake traction control system.

The electronic-controlled brake system includes a plurality of solenoid valves to control a brake oil pressure transmitted to a caliper brake (also called a hydraulic brake or a disc brake) mounted on a wheel of a vehicle, a pair of a low-pressure accumulator and a high-pressure accumulator to temporarily store oil flowing out of the wheel cylinder, a motor and a pump to forcibly pump the oil in the low-pressure accumulator, a plurality of check valves to prevent reverse flow of the oil, and an electronic control unit (ECU) to control the operations of the solenoid valves and the motor. These constituents are compactly installed in a hydraulic block formed of aluminum. In addition, once a driver pushes a brake pedal, a hydraulic-pressure supply device senses displacement of the pedal through a pedal displacement sensor, and receives an electric signal indicating the driver's braking intention from the pedal displacement sensor, such that pressure is supplied to the wheel cylinder.

A representative example of the electronic control brake system including the above-mentioned hydraulic-pressure supply device has been disclosed in United States Patent Publication No. US 2012/0091787. In this cited reference, the hydraulic-pressure supply device is configured to operate the motor in response to foot force applied to a brake peal, such that brake pressure is generated. In this case, the brake pressure converts rotational force of the motor into rectilinear motion and presses a piston, resulting in the occurrence of brake pressure.

However, the above-mentioned electronic control brake system having a single-acting structure must control the piston pressurized either during regeneration of pressure or during boosting of the generated pressure to return to an original position in such a manner that the piston is re-operated at the original position, such that it is difficult to perform rapid pressure generation and precise control.

In addition, in order to electronically control the brake system as well as to perform various functions, a plurality of valves and flow passages are needed such that the entire system including such valves and flow passages becomes complicated in structure.

CITED REFERENCE

Patent Document

United States Patent Publication No. US 2012/0091787 (published on 19 Apr. 2012, Hitachi Co., Ltd.)

SUMMARY

Therefore, it is an aspect of the present invention to provide an electric brake system in which hydraulic pressure generated from a hydraulic-pressure supply device operates in a double-acting manner, such that the electric brake system can quickly generate pressure during pressure regeneration and during boosting of the generated pressure, resulting in implementation of precise pressure control.

It is another aspect of the present invention to provide an electric brake system configured to have a minimum number of valves controlling the flow of hydraulic pressure so as to implement a simplified structure, such that it can perform braking by foot force of a driver.

Additional aspects of the invention will be set forth in part in the description which follows and, in part, will be obvious from the description, or may be learned by practice of the invention.

In accordance with an aspect of the present invention, an electric brake system includes: a reservoir configured to store oil; a master cylinder having first and second hydraulic ports, connected to the reservoir to receive oil from the reservoir; a simulation device connected not only to a pedal displacement sensor sensing a displacement of a brake pedal, but also to the master cylinder, configured to provide reaction force in response to foot force applied to the brake pedal; a hydraulic-pressure supply device configured to convert rotational force of a motor into rectilinear motion upon receiving an electric signal from the pedal displacement sensor according to operation of the brake pedal, and move a double-acting piston designed to perform reciprocating motion within a hydraulic cylinder, wherein the double-acting piston moves in one direction to generate hydraulic pressure by pressing a first hydraulic chamber provided in one end thereof, and moves in another direction to generate hydraulic pressure by pressing a second hydraulic chamber provided in the other end thereof; a hydraulic-pressure control unit including a first hydraulic circuit connected to the first hydraulic chamber via a first hydraulic passage, and a second hydraulic circuit connected to the second hydraulic chamber via a second hydraulic passage, configured to control flow of hydraulic pressure applied to a caliper brake installed in each wheel via a plurality of valves disposed in the first and second hydraulic circuits; a first backup passage configured to connect the first hydraulic port to the first hydraulic chamber; a second backup passage configured to connect the second hydraulic port to the second hydraulic chamber; a first cut valve disposed in the first backup passage, configured to control flow of hydraulic pressure; a second cut valve disposed in the second backup passage, configured to control flow of hydraulic pressure; and an electronic control unit (ECU) configured to control a motor and one or more valves on the basis of hydraulic pressure information and pedal displacement information.

The first hydraulic circuit may include a first switching valve disposed in the first hydraulic passage, and a first dump valve disposed in a passage through which the first hydraulic passage is connected to a reservoir; and the second hydraulic circuit may include a second switching valve disposed in the second hydraulic passage, and a second dump valve disposed in a passage through which the second hydraulic passage is connected to a reservoir.

The first and second dump valves may be respectively connected to the first and second hydraulic chambers, may be selectively opened or closed according to forward or backward movement of the double-acting piston, may suction oil from the reservoir, allow the first hydraulic chamber or the second hydraulic chamber to be filled with the suctioned oil, and may discharge the oil of the first hydraulic chamber or the second hydraulic chamber to a reservoir.

The first and second switching valves may be implemented as normally opened (NO) solenoid valves that remain opened in a normal state and then closed upon receiving a closing signal.

The first and second dump valves may be implemented as normally closed (NC) solenoid valves that remain closed in a normal state and then opened upon receiving a closing signal.

The hydraulic-pressure control unit may further include a balance valve disposed between the first and second hydraulic circuits such that the two hydraulic circuits are connected to each other or are disconnected from each other; and one end of a passage in which the balance valve is disposed may be connected to downstream of the first switching valve and the first dump valve, and the other end of the passage may be connected to downstream of the second dump valve.

The balance valve may be implemented as a normally closed (NC) solenoid valve that remains closed in a normal state and then opened upon receiving an opening signal.

The hydraulic control unit may further include: a normally opened (NO) inlet valve disposed upstream of the caliper brake such that hydraulic pressure transmission to the caliper brake is controlled.

The first and second cut valves may be implemented as normally opened (NO) solenoid valves that remain opened in a normal state and then closed upon receiving a closing signal from the electronic control unit (ECU).

The first hydraulic chamber and the second hydraulic chamber may have different-sized hydraulic regions, and an elastic member may be configured to elastically support a double-acting piston in one hydraulic chamber having a relatively smaller-sized hydraulic region.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
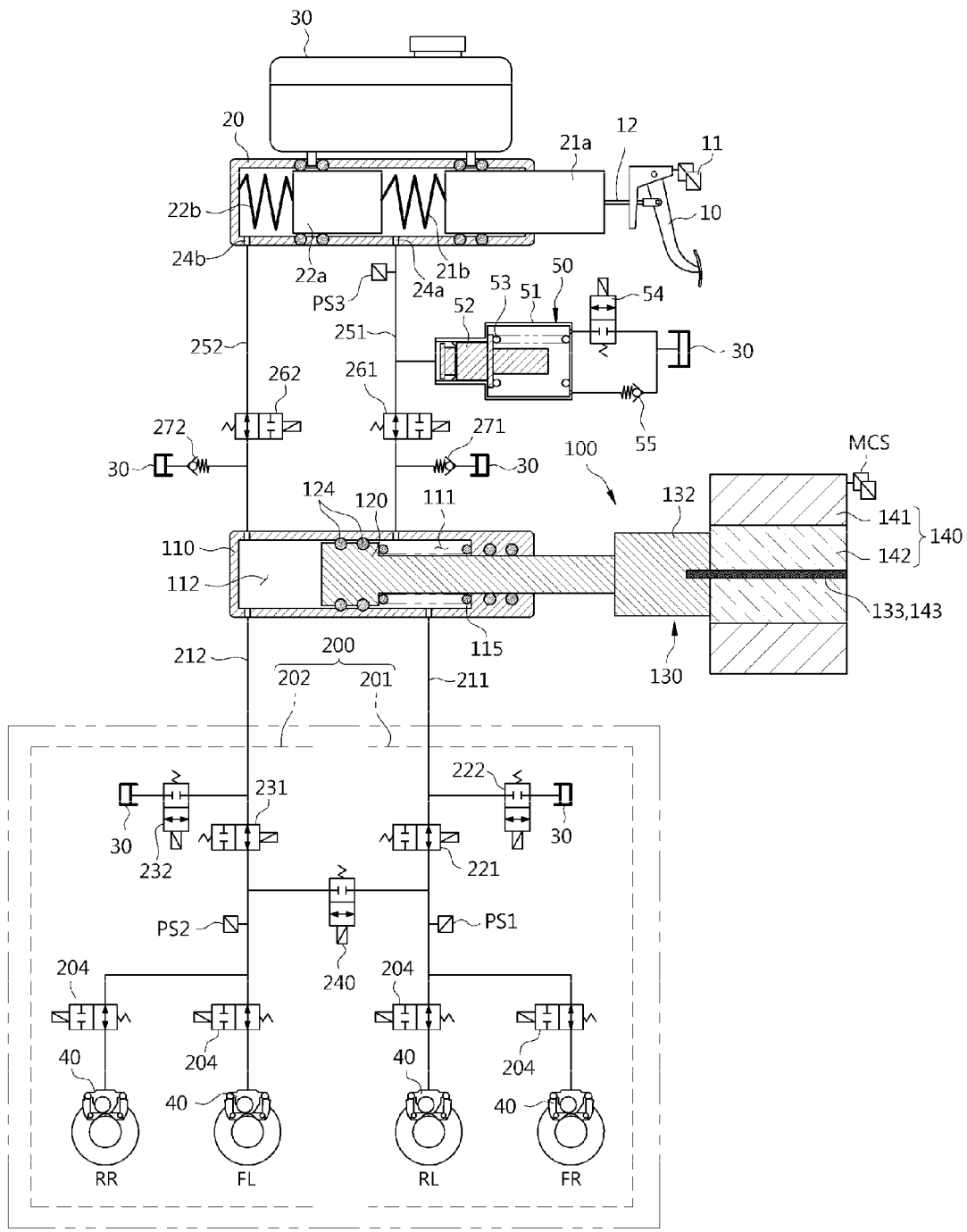
FIG. 1 is a hydraulic circuit view illustrating a non-brake state of an electric brake system according to an embodiment of the present invention.

Reference will now be made in detail to the embodiments of the present invention, examples of which are illustrated in the accompanying drawings, wherein like reference numerals refer to like elements throughout.

FIG. 1 is a hydraulic circuit view illustrating a non-brake state of an electric brake system according to an embodiment of the present invention.

Referring to FIG. 1, an electric brake system generally includes, a master cylinder 20 to generate hydraulic pressure, a reservoir 30 coupled to the upper portion of the master cylinder 20 to store oil, an input rod 12 to apply pressure to the master cylinder 20 according to foot force applied to a brake pedal 10, a caliper brake 40 to perform braking of the respective wheels (RR, RL, FR, FL) when the oil in the reservoir 20 is transferred thereto, and a pedal displacement sensor 11 to sense displacement of the brake pedal 10.

Herein, the master cylinder 20 may be provided with at least one chamber to generate hydraulic pressure. Referring to FIG. 1, the master cylinder 20 is provided with a first piston 21a and a second piston 22a to have two hydraulic chambers, and contacts the input rod 12. Providing the master cylinder 20 with two chambers is intended to secure safety in the event of malfunction. For example, the first one of the two chambers s is connected to the front right wheel FR and the rear left wheel RL of the vehicle, and the other one of the two chambers is connected to the front left wheel FL and the rear right wheel RR. Typically, the first one of the two chambers is connected to the two front wheels (FR, FL), and the other one of the two chambers is connected to the two rear wheels (RR, RL). By configuring the two chambers to be independent from each other, braking of the vehicle remains possible even when one of the two chambers malfunctions. In addition, the master cylinder 20 includes first and second hydraulic ports (24a, 24b) through which hydraulic pressure is discharged outside from two chambers.

A first spring 21b is disposed between the first piston 21a and the second piston 22a of the master cylinder 20, and a second spring 22b is disposed between the second piston 22a and the end of the master cylinder 20.

The first spring 21b and the second spring 22b store elastic force when the first cylinder 21a and the second cylinder 22a are compressed. When the force pushing the first cylinder 21a becomes weaker than the elastic force, the elastic force pushes the first and second pistons 21a and 22a back to original positions thereof. In more detail, the first spring 21b and the second spring 22b are respectively embedded in two chambers, store elastic force when the first piston 21a and the second piston 22a are compressed. When the force pushing the first piston 21a becomes weaker than the elastic force, the elastic force pushes the first and second pistons (21a, 22a) back to original positions thereof.

The input load 12 to pressurize the first piston 21a of the master cylinder 20 closely contacts the first piston 21a and a gap between the master cylinder 20 and the input load 12 is thus not present. That is, the brake pedal 10 directly pressurizes the master cylinder 20 without a pedal free stroke region, when the brake pedal 10 is pressed.

The electric brake system according to one embodiment of the present invention includes a hydraulic-pressure supply device 100 to operate by receiving a driver's intention to implement braking in the form of an electrical signal from the pedal displacement sensor 11 that senses displacement of the brake pedal 10; a hydraulic-pressure control unit 200 composed of first and second hydraulic circuits (201, 202) configured to control flow of hydraulic pressure supplied to the caliper brake 40 disposed in each wheel (RR, RL, FR, FL); first and second cut valves (261, 262) disposed in first and second backup flow passages (251, 252) configured to interconnect first and second hydraulic ports (24a, 24b) and the hydraulic-pressure supply device 100 so as to control flow of hydraulic pressure; a simulation device 50 connected to the master cylinder 20 to supply reaction force to the brake pedal 10; and an electronic control unit (ECU) (not shown) to control the hydraulic-pressure supply device 100 and valves (54, 204, 221, 222, 231, 232, 240, 261, 262) on the basis of hydraulic pressure information and pedal displacement information.

The hydraulic-pressure supply device 100 includes a hydraulic cylinder 110 having a predetermined space therein to store oil supplied thereto; a double-acting piston 120 arranged in the hydraulic cylinder 110 to perform rectilinear motion; a motor 140 to produce rotational force according to an electrical signal from the pedal displacement sensor 11; and a power switching unit 130 to convert the rotational motion of the motor 140 into rectilinear motion such that the double-acting piston 120 rectilinearly moves. In this case, the hydraulic chambers (111, 112) are classified into a first hydraulic chamber 111 and a second hydraulic chamber 112 on the basis of the double-acting piston 120 interposed therebetween. That is, a sealing member 124 is mounted to an outer surface of the double-acting piston 120 and closely contacts an inner surface of the hydraulic cylinder 120, such that the internal space of the hydraulic cylinder 110 is classified into two hydraulic chambers (111, 112). The two hydraulic chambers (111, 112) may be formed to have the same or different sizes.

The hydraulic pressure generated by the first and second hydraulic chambers (111, 112) may be applied to respective wheels (RR, RL, FR, FL) of the hydraulic-pressure control unit 200 to be described later. That is, the first hydraulic chamber 111 is connected to the first hydraulic circuit 201 through a first hydraulic passage 211, and the second hydraulic chamber 112 is connected to a second hydraulic circuit 202 through a second hydraulic passage 212.

In addition, the first hydraulic chamber 111 may be coupled to a first backup passage 251 connected to the first hydraulic port 24a, and the second hydraulic chamber 112 may be coupled to a second backup passage 252 connected to the second hydraulic port 24b. In this case, the cut valves (261, 262) are disposed in the first and second backup passages (251, 252), such that the passages are cut off when the system normally operates, and thus the space among the first and second hydraulic chambers (111, 112) and the master cylinder 20 is closed.

The double-acting piston 120 to press the first and second hydraulic chambers (111, 112) is connected to the power switching unit 130 configured to convert rotational force of the motor 140 into rectilinear motion within the hydraulic cylinder 110, such that the double-acting piston 120 performs sliding.

The motor 140 is an electric motor that generates rotational force based on a signal output from an electronic control unit (ECU: not shown). The motor 140 includes a stator 141, a rotor 142, and a rotation axis 143 coupled to the rotor 142, such that it generates rotational force in forward or reverse directions by the ECU. Herein, the motor 140 is well known to those skilled in the art, and as such a detailed description thereof will herein be omitted for convenience of description.

The power switching unit 130 converts rotational force into rectilinear motion. For example, the power switching unit 130 may be formed of a ball-screw-nut assembly. The power switching unit 130 may include a screw 133 integrated with the rotation axis 143, and a ball nut 132 screw-coupled to the screw 133 in a rotation limitation state to perform rectilinear motion. In this case, the rotation axis 143 may be formed to function as the screw 133.

Although not shown in the drawings, the power switching unit 130 may include a ball nut to rotate upon receiving rotational force from the rotation axis of the motor; and a screw being screw-coupled to the ball nut in a restricted rotation state according to rotation of the ball nut. The above-mentioned ball-screw-nut assembly to convert rotational force to rectilinear motion is well known to those skilled in the art, and as such a detailed description thereof will herein be omitted. In addition, the power switching unit 130 according to the present invention may be implemented not only as the ball-screw-nut assembly, but also as any structure capable of converting rotational force into rectilinear motion without departing from the scope or spirit of the present invention.

As described above, the double-acting piston 120 of the hydraulic-pressure supply device 100 having a double-acting structure may rectilinearly move according to rotation direction of the motor 140, may generate hydraulic pressure by pressing the first hydraulic chamber 111 and the second hydraulic chamber 112, may be more precisely controlled according to a rotation angle or speed of the motor 140.

Meanwhile, two hydraulic chambers (111, 112) formed in the hydraulic cylinder 110 of the hydraulic-pressure supply device 100 may have different sizes. Thereby, an elastic member 115 elastically supporting the double-acting piston 120 may be arranged in one hydraulic chamber having a relatively smaller-sized hydraulic region from among the first hydraulic chamber 111 and the second hydraulic chamber 112. As can be seen from the drawings, the elastic member 115 may be disposed in the first hydraulic chamber 111. When the first backup passage 251 and the second backup passage 252 are respectively coupled to the hydraulic chambers (111, 112) and hydraulic pressure is transferred, the elastic member 115 can support the double-acting piston 120. That is, if the double-acting piston 120 moves by a pressure difference between two hydraulic chambers (111, 112), the double-acting piston 120 can be maintained at the original position thereof by the elastic member 115.

The hydraulic-pressure control unit 200 may include a first hydraulic circuit 201 and a second hydraulic circuit 202 to respectively control two wheels upon receiving hydraulic pressure. Herein, wheels controlled by the first hydraulic circuit 201 may include a right front wheel FR and a left rear wheel RL, and wheels controlled by the second hydraulic circuit 202 may include a left front wheel FL and a right rear wheel RR. Each of the wheels (FR, FL, RR, RL) is provided with a caliper brake 40 to perform braking when hydraulic pressure is supplied thereto. That is, the hydraulic-pressure control unit 200 may receive hydraulic pressure from the hydraulic-pressure supply device 100 through the first and second hydraulic passages (211, 212) respectively connected to the first and second hydraulic circuits (201, 202), and each of the hydraulic circuits (201, 201) may include a plurality of valves (204, 221, 222, 231, 232) to control flow of hydraulic pressure.

The first hydraulic circuit 201 may include a first switching valve 221, a first dump valve 222, and an inlet valve 204. The first switching valve 221 is disposed in the first hydraulic passage 211 to control hydraulic pressure supplied to the caliper brake 40. The first dump valve 222 is disposed in a flow passage configured to interconnect the first hydraulic passage 211 and the reservoir 30. The inlet valve 204 is arranged upstream of the caliper brake 40 installed into each of two wheels (FR, RL) such that hydraulic pressure supplied to the caliper brake 40 can be controlled.

The second hydraulic circuit 202 may include a second switching valve 231, a second dump valve 232, and an inlet valve 204. The second switching valve 231 is disposed in the second hydraulic passage 212 to control hydraulic pressure supplied to the caliper brake 40. The second dump valve 232 is disposed in a flow passage configured to interconnect the second hydraulic passage 212 and the reservoir 30. The inlet valve 204 is arranged upstream of the caliper brake 40 installed into each of two wheels (FL, RR) such that hydraulic pressure supplied to the caliper brake 40 can be controlled.

The opening/closing operations of the first and second switching valves (221, 231) may be independently controlled by the ECU, and hydraulic pressure generated from the hydraulic-pressure supply device 100 can be transferred to the caliper brake 40 during the opening or closing operation. That is, the first switching valve 221 may control hydraulic pressure supplied to the first hydraulic circuit 201, and the second switching valve 231 may control hydraulic pressure supplied to the second hydraulic circuit 202.

In addition, the first and second dump valves (222, 232) may be opened or closed according to the forward or backward direction of the double-acting piston 120, may control flow of hydraulic pressure contained in the first and second hydraulic chambers (111, 112), may suction oil from the reservoir 30 to fill the first hydraulic chamber 111 or the second hydraulic chamber 112 with the suctioned oil, and may function to discharge the oil of the first or second hydraulic chamber 111 or 112 to the reservoir 30. Detailed operations and functions of the first and second dump valves (222, 232) will be described later.

The first and second switching valves (221, 231) are implemented as normally opened (NO) solenoid valves that remain open in a normal state and then closed upon receiving the closing signal.

The first and second dump valves (222, 232) are implemented as normally closed (NC) solenoid valves that remain closed in a normal state and then closed upon receiving the opening signal.

The inlet valve 204 arranged upstream of the caliper brake 40 is implemented as a normally opened (NO) solenoid valve so as to control the operation for transmitting hydraulic pressure to the caliper brake 40. Through the opening or closing operation, the inlet valve 204 may transmit hydraulic pressure to the caliper brake 40 or stop hydraulic pressure transmission to the caliper brake 40, or may discharge the hydraulic pressure.

In addition, the hydraulic-pressure control unit 200 may further include an outlet valve (not shown) connected to the reservoir 30 so as to improve performance or throughput. Although not shown in the drawings, the outlet valve may connect at least one wheel (RR, RL, FR, or FL) of the first and second hydraulic circuits (201, 202) to the reservoir 30, and may control discharging hydraulic pressure from the wheels (RR, RL, FR, FL). Each outlet valve may be implemented as a normally closed (NC) solenoid valve.

In accordance with one aspect of the present invention, a balance valve 240 disposed between the first and second hydraulic circuits (201, 202) may control connection of the two hydraulic circuits (201, 202). In more detail, the balance valve 240 may be arranged between the first and second hydraulic circuits (201, 202), and may be arranged downstream of the first switching valve 221, the first dump valve 222, the second switching valve 231, and the second dump valve 232, such that the balance valve 240 can be connected to respective hydraulic passages (211, 212). The balance valve 240 may supply flow of hydraulic pressure generated from the first and second hydraulic chambers (111, 112) to the first and second hydraulic circuits (201, 202), such that the hydraulic pressure can be supplied to the caliper brake 40 disposed in each of the hydraulic circuits (201, 202). The operation structure of the balance valve 240 will hereinafter be described in detail.

The balance valve 240 may be implemented as a normally closed (NC) solenoid valve that remains closed in a normal state and then opened in response to pressure information.

In the meantime, the first backup passage 241 and the second backup passage 252 are connected to the first and second hydraulic chambers (111, 112) in such a manner that hydraulic pressure generated from the master cylinder 20 can be transferred to the caliper brake 40.

In the meantime, the balance valve 240 may be connected to the first and second backup passage (251, 252) connected to respective hydraulic ports (24a, 24b). The first backup passage 251 and the second backup passage 252 may form a flow passage between the master cylinder 20 and the caliper brake 40. That is, the first and second backup passages (251, 252) may transmit hydraulic pressure generated from the master cylinder 20 to each caliper brake 40 when the electric brake system malfunctions. In more detail, a first cut valve 261 to control the flow of oil is arranged in the first backup passage 251, and a second cut valve 262 to control the flow of oil is arranged in the second backup passage 252. In addition, the first backup passage 251 may connect the first hydraulic port 24a to the first hydraulic circuit 201, and the second backup passage 252 may connect the second hydraulic port 25b to the second hydraulic circuit 202.

Each of the first and second cut valves (261, 262) may be implemented as a normal-open-type solenoid valve that remains open in a normal state and is closed upon receiving a signal for the closing operation from the electronic control unit (ECU).

A simulation device 50, connected to the master cylinder 20 to provide reaction force according to the foot force applied to the brake pedal 10, is provided. According to the illustrated embodiment, the flow passage connecting the master cylinder 20 to the simulation device 50 is connected to the first backup passage 251. The simulation device 50 includes a simulation chamber 51 adapted to store oil discharged through the first hydraulic port 24a of the master cylinder 20, a reaction piston 52 arranged in the simulation chamber 51, a pedal simulation device having a reaction spring 53 configured to elastically support the reaction piston 52, and a simulation valve 54 connected to the rear end of the simulation chamber. The reaction piston 52 and the reaction spring 53 are caused to perform displacement within a certain range by the oil introduced into the simulation chamber 151.

The simulation valve 54 may connect the rear end of the simulation chamber 51 to the reservoir 30. That is, the inlet of the simulation chamber 51 is connected to the master cylinder 20, and the rear end of the simulation chamber 51 is connected to the simulation valve 54. The simulation valve 54 is connected to the reservoir 30, such that the pedal simulation device (i.e., the inner space of the simulation chamber 51) is fully filled with oil.

The simulation valve 54 is a normally closed (NC) solenoid valve which is normally in a closed state. Thereby, when the driver depresses the brake pedal 10, the simulation valve 155 is opened to allow the braking oil to be transferred to the simulation chamber 51.

In addition, the simulation check valve 55 may be disposed between the simulation chamber 51 and the simulation valve 54. The simulation check valve 55 may be designed in a manner that oil can flow from the reservoir 30 only to the simulation chamber 51. That is, reaction piston 52 of the pedal simulation device compresses the reaction spring 53, and the oil stored in the simulation chamber 51 may be transferred to the reservoir 30 through the simulation valve 54. Since the simulation chamber 51 is filled with oil, friction of the reaction piston 52 is minimized during the operation of the simulation device 50, so that the simulation device 50 may have high durability and may have a cut-off structure to prevent introduction of a foreign material from the external part.

When a driver takes a foot off the brake pedal 10 to release the pressure applied to the brake pedal 10, the oil is supplied to the simulation chamber 51 via the simulation check valve 55, such that pressure of the pedal simulator can rapidly return.

In addition, the electric brake system may include a third dump valve 271 disposed in a passage configured to interconnect the first backup passage 251 and the reservoir 30; and a fourth dump valve 272 disposed in a passage configured to interconnect the second backup passage 252 and the reservoir 30.

The third dump valve 271 may be arranged in a passage branched from a section interposed between the first cut valve 261 and the hydraulic-pressure supply device 100, and may be implemented as a check valve configured to allow only the flow from the reservoir 30 to the first backup passage 251. If the hydraulic cylinder 110 has an insufficient or low hydraulic pressure, the third dump valve 271 may allow the first hydraulic chamber 111 to be filled with the oil of the reservoir 30.

The fourth dump valve 272 may be arranged in a passage branched from a section interposed between the second cut valve 262 and the hydraulic cylinder 110 of the hydraulic-pressure supply device 100, and may be implemented as a check valve configured to allow only the flow from the reservoir 30 to the second backup passage 252. If the hydraulic cylinder 110 has an insufficient or low hydraulic pressure, the fourth dump valve 272 may allow the second hydraulic chamber 112 to be filled with the oil of the reservoir 30.

Meanwhile, reference numeral 'PS1' not illustrated is a first pressure sensor to sense a hydraulic pressure of the first hydraulic circuit 201, reference numeral 'PS2' not illustrated is a second pressure sensor to sense a hydraulic pressure of the second hydraulic circuit 202, reference numeral 'PS3' not illustrated is a third pressure sensor to sense an oil pressure of the master cylinder 20, and reference numeral 'MCS' not illustrated is a rotation angle of the motor or a motor control sensor configured to control a current of the motor.

Figure 2:
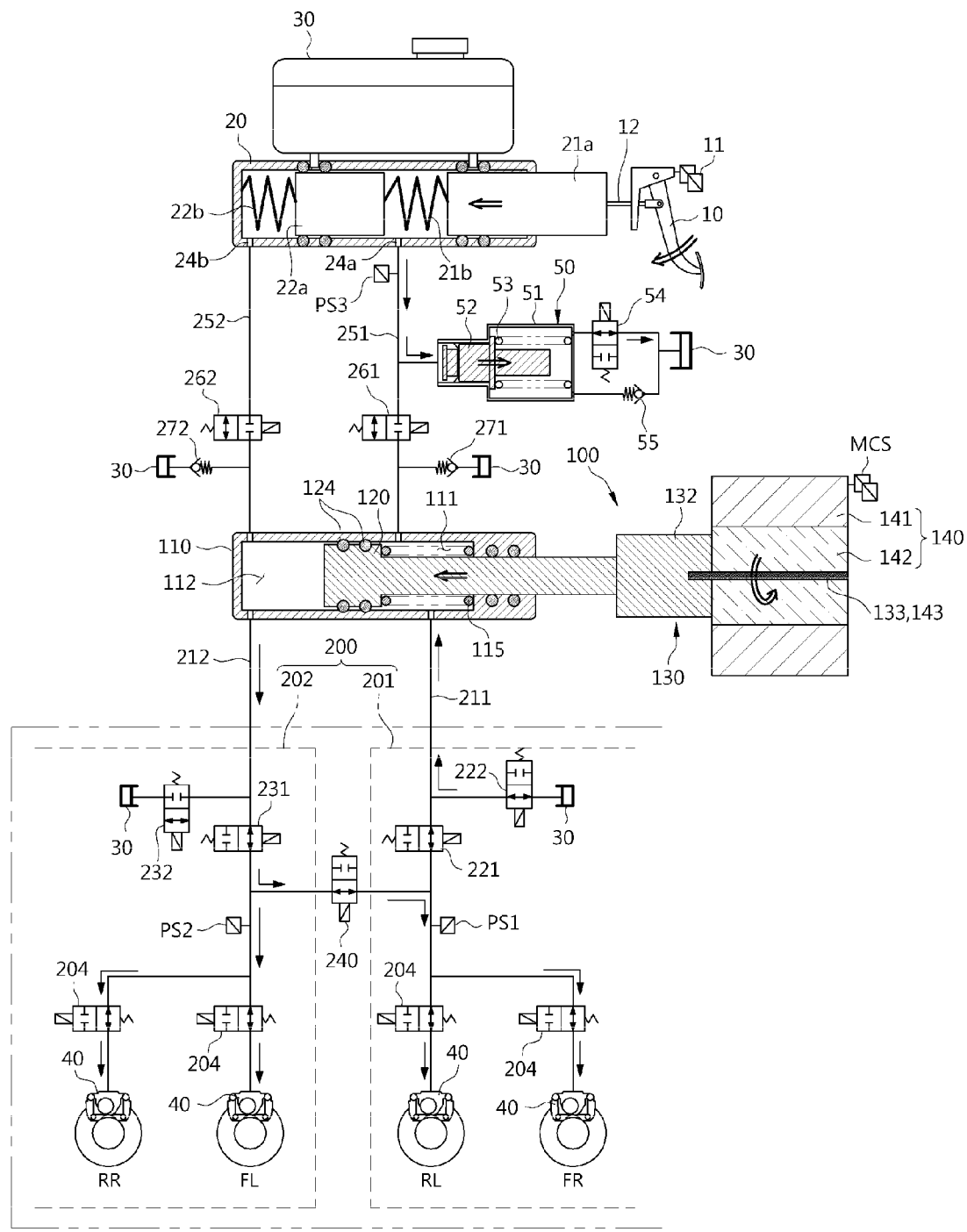
FIG. 2 is a hydraulic circuit view illustrating a normal operation of an electric brake system according to an embodiment of the present invention.

FIG. 2 is a hydraulic circuit view illustrating a normal operation state of an electric brake system according to an embodiment of the present invention.

Referring to FIG. 2, when braking is started by the driver, the amount of braking desired by the driver may be sensed through the pedal displacement sensor 11 based on the information about the pressure applied to the brake pedal 10 by the driver. The ECU (not shown) receives an electrical signal output from the pedal displacement sensor 11 and drives the motor 140. In addition, the ECU may receive the magnitude of regenerative braking through the third pressure sensor PS3 arranged at the outlet of the master cylinder 20 and the first and second pressure sensors (PS1, PS2) arranged at the first and second hydraulic circuits (201, 202), and calculate the magnitude of frictional braking according to the difference between the braking desired by the driver and the regenerative braking. Thereby, the ECU may recognize the magnitude of increase or decrease in pressure at the wheel side.

Specifically, when the driver steps on the brake pedal 10 at the initial stage of braking, the motor 140 operates, and the rotational force of the motor 140 is converted into rectilinear motion by the power switching unit 130, such that the double-acting piston 120 moves forward and presses the second hydraulic chamber 112, resulting in the occurrence of hydraulic pressure. In this case, the first and second cut valves (261, 262) installed in the first and second backup passages (251, 252) connected to the first and second hydraulic ports (24a, 24b) are closed to prevent the hydraulic pressure generated from the master cylinder 20 from being transferred to the caliper brake 40.

In addition, hydraulic pressure generated from the second pressure chamber 112 is transferred to each caliper brake 40 because the second switching valve 231 and the balance valve 240 are opened, resulting in the occurrence of braking force.

In addition, the second dump valve 232 remain closed, such that hydraulic pressure generated from the second hydraulic chamber 112 can be transferred to the caliper brake 40 without loss. In this case, the internal region of the first hydraulic chamber 11 increases in size by forward movement of the double-acting piston 120, the first dump valve 222 is opened to suction oil from the reservoir 30, such that the first hydraulic chamber 111 is filled with the oil. Herein, the first switching valve 221 is closed in a manner that the oil suctioned from the first dump valve 222 moves to the first hydraulic chamber 111.

Meanwhile, pressure generated from the master cylinder 20 pressurized in response to foot force applied to the brake pedal 10 may be transferred to the simulation device 50 connected to the master cylinder 20. In this case, the normally closed (NC) simulation valve 54 arranged at the rear end of the simulation chamber 51 is opened such that oil filled in the simulation chamber 51 is transmitted to the reservoir 30 through the simulation valve 54. In addition, the reaction piston 52 moves and pressure corresponding to a weight of the reaction spring supporting the reaction piston 52 is formed in the simulation chamber 51, resulting in formation of proper pedal feeling for the driver.

Figure 3:
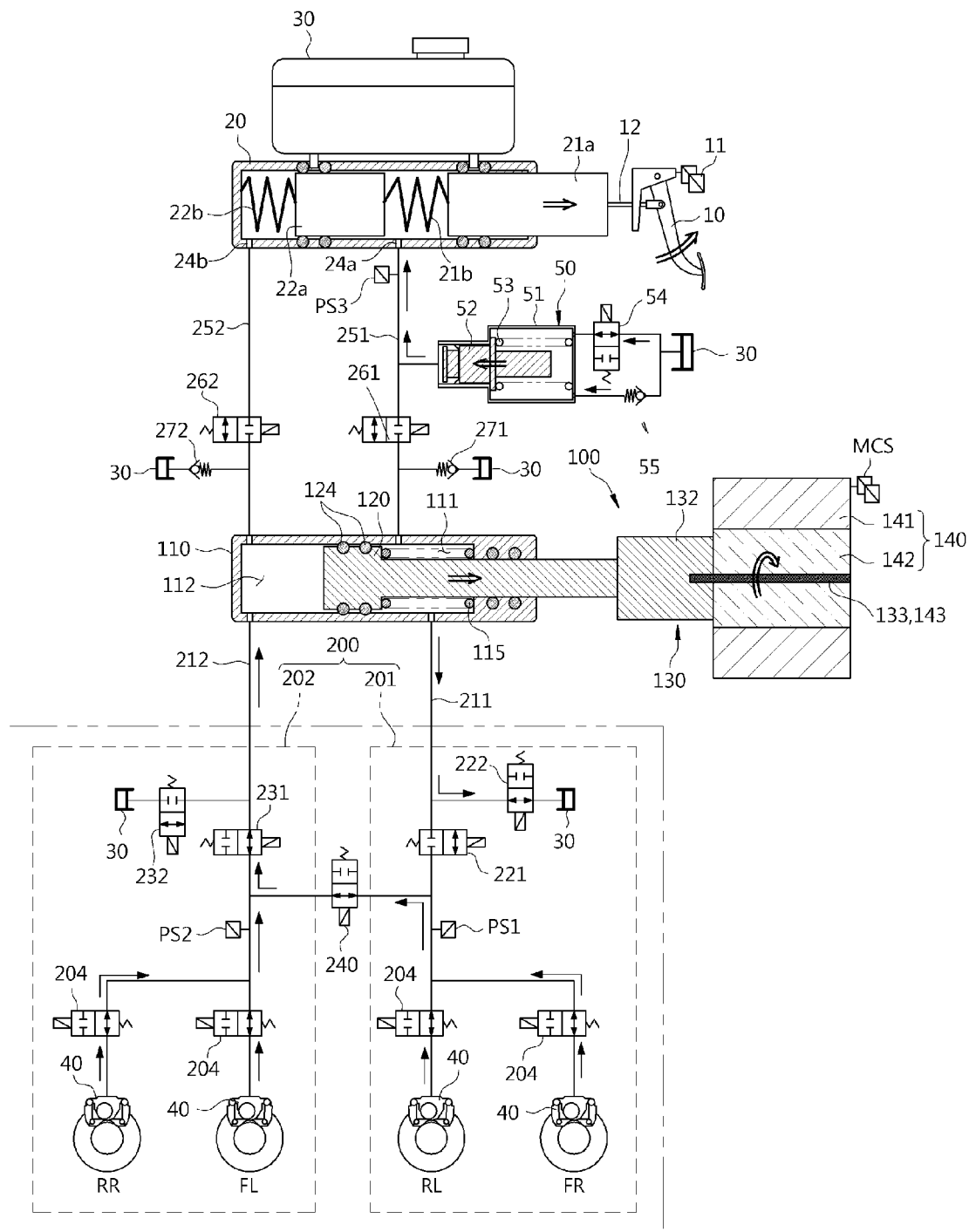
FIG. 3 is a hydraulic circuit view illustrating a normal brake release state of an electric brake system according to an embodiment of the present invention.

FIG. 3 is a hydraulic circuit view illustrating a normal brake release state of an electric brake system according to an embodiment of the present invention. When braking force is released from a normal brake state achieved by a normal operation of the above-mentioned electric brake system, the electric brake system can operate as follows. Referring to FIG. 3, if foot force applied to the brake pedal 10 is released, the motor 40 generates rotational force in the opposite direction to the forward direction of the double-acting piston 120, such that the double-acting piston 120 returns to its own original position. Here, the respective valves (54, 204, 221, 222, 231, 232, 240, 261, 262) controlling flow of hydraulic pressure maintain the same opening/closing states as in the braking operation, such that the second hydraulic chamber 112 can be filled with the oil. That is, hydraulic pressure discharged from the caliper brake 40 of the first hydraulic circuit 201 is applied to the second hydraulic passage 212 along with hydraulic pressure discharged from the caliper brake 40 of the second hydraulic circuit 202 via the balance valve 240, and is finally introduced into the second hydraulic chamber 112. In addition, the oil of the first hydraulic chamber 111 pressurized by backward movement of the double-acting piston 120 is transferred to the reservoir 30 via the first dump valve 222, and then stored in the reservoir 30.

In the simulation device 50, the oil stored in the simulation chamber 51 is transferred to the master cylinder 20 because the reaction piston 52 returns to its own original position by the reaction spring 52. The simulation chamber 51 may be re-filled with the oil through the simulation valve 54 and the simulation check valve 55 connected to the reservoir 30, such that pressure of the pedal simulator can rapidly return.

Meanwhile, the electric brake system according to the embodiment controls valves (204, 221, 222, 231, 232, 240) disposed in the hydraulic-pressure control unit 200 according to pressure required for the caliper brake 40 mounted to each wheel (RR, RL, FR, FL) of the two hydraulic circuits (201, 202), such that a c control range may be specified and then controlled. For example, as shown in FIGS. 4 and 5, after one wheel FL from among two wheels (RR, FL) of the second hydraulic circuit 202 is braked during operation of the anti-lock brake system (ABS), the other wheel RR of the same hydraulic circuit 202 is then braked.

Figure 4:
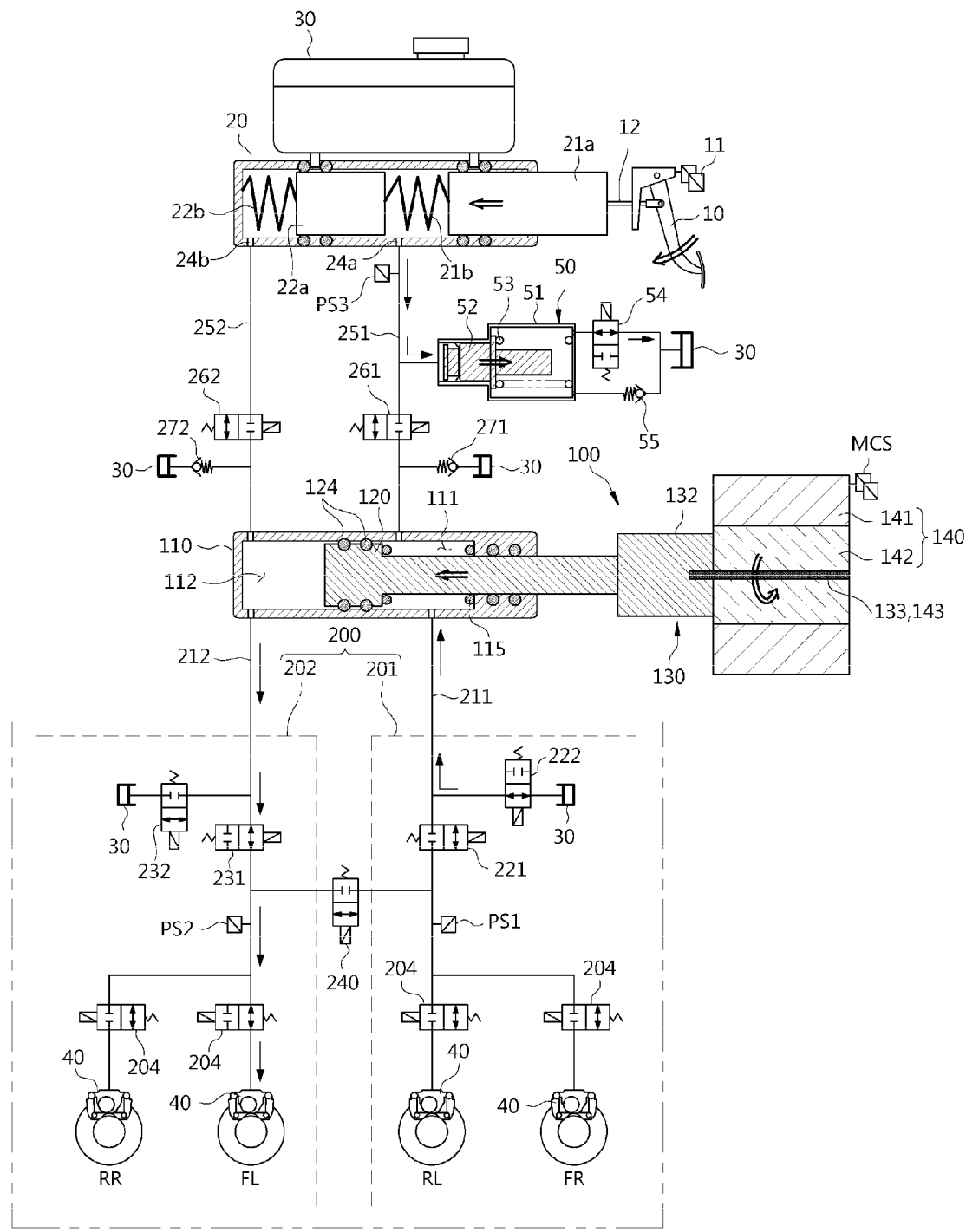
FIGS. 4 and 5 are hydraulic circuit views illustrating an ABS operation state of the electric brake system according to an embodiment of the present invention.

Referring to FIG. 4, the motor 140 starts operation in response to foot force applied to the brake pedal 10, rotational force of the motor 140 is converted into rectilinear movement, the double-acting piston 120 moves forward to pressurize the second hydraulic chamber 112, resulting in the occurrence of hydraulic pressure. In this case, the first and second cut valves (261, 262) are closed, such that hydraulic pressure generated from the master cylinder 20 is not transferred to the first and second hydraulic chambers (111, 112). In addition, the inlet valve 204 is closed, which is arranged upstream of the right rear wheel (RR) of the first switching valve 221, the second dump valve 232, the balance valve 240, and the second hydraulic circuit 202. Thereby, hydraulic pressure generated from the second hydraulic chamber 112 is transferred to the second hydraulic circuit 202 through the second switching valve 231, and hydraulic pressure is transferred only to the left front wheel (FL) from among two wheels (RR, FL). In this case, the first switching valve 221 is closed and the first dump valve 22 is opened to suction the oil from the reservoir 30, such that the suctioned oil can be transferred to the first hydraulic chamber 111.

Figure 5:
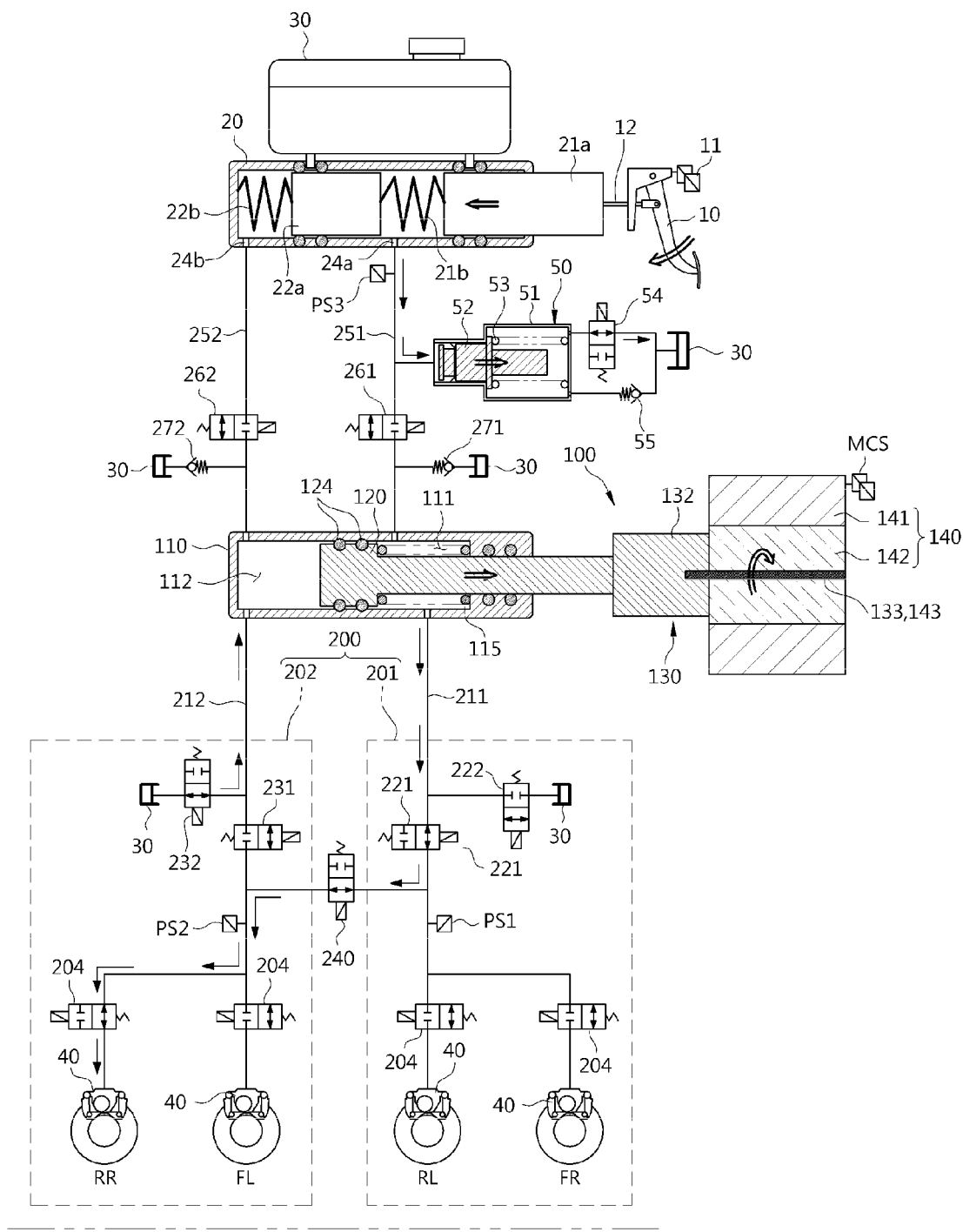

Referring to FIG. 5, the double-acting piston 120 to convert rotational force of the motor 140 into rectilinear motion moves backward, such that the double-acting piston 120 presses the first hydraulic chamber 111, resulting in the occurrence of hydraulic pressure.

In this case, the first and second cut valves (261, 262) are closed such that hydraulic pressure generated from the master cylinder 20 is not transferred to the first and second hydraulic chambers (111, 112).

In addition, the first dump valve 222 and the second switching valve 231 are closed, and the remaining inlet valve 204 other than the inlet valve 204 arranged upstream of the right rear wheel (RR) from among the respective wheels (RR, RL, FR, FL) is closed. Therefore, hydraulic pressure generated from the first hydraulic chamber 111 is transferred to the second hydraulic circuit 202 through the first switching valve 221 and the balance valve 240, and hydraulic pressure may be transferred only to the right rear wheel (RR) from among two wheels (RR, FL). In this case, the second dump valve 232 is opened to suction the oil from the reservoir 30, such that the suctioned oil is transferred to the second hydraulic chamber 112.

Since the electric brake system according to the embodiments includes a double-acting hydraulic-pressure supply device 100, the electric brake system generates hydraulic pressure even in the case in which the double-acting piston 120 moves backward, such that the hydraulic pressure can be transferred to wheels (RR, RL, FR, FL) in which hydraulic pressure is needed. That is, the electric brake system according to the embodiments can more quickly regenerate and boost pressure as compared to the conventional single-acting piston structure, resulting in response improvement.

Figure 6:
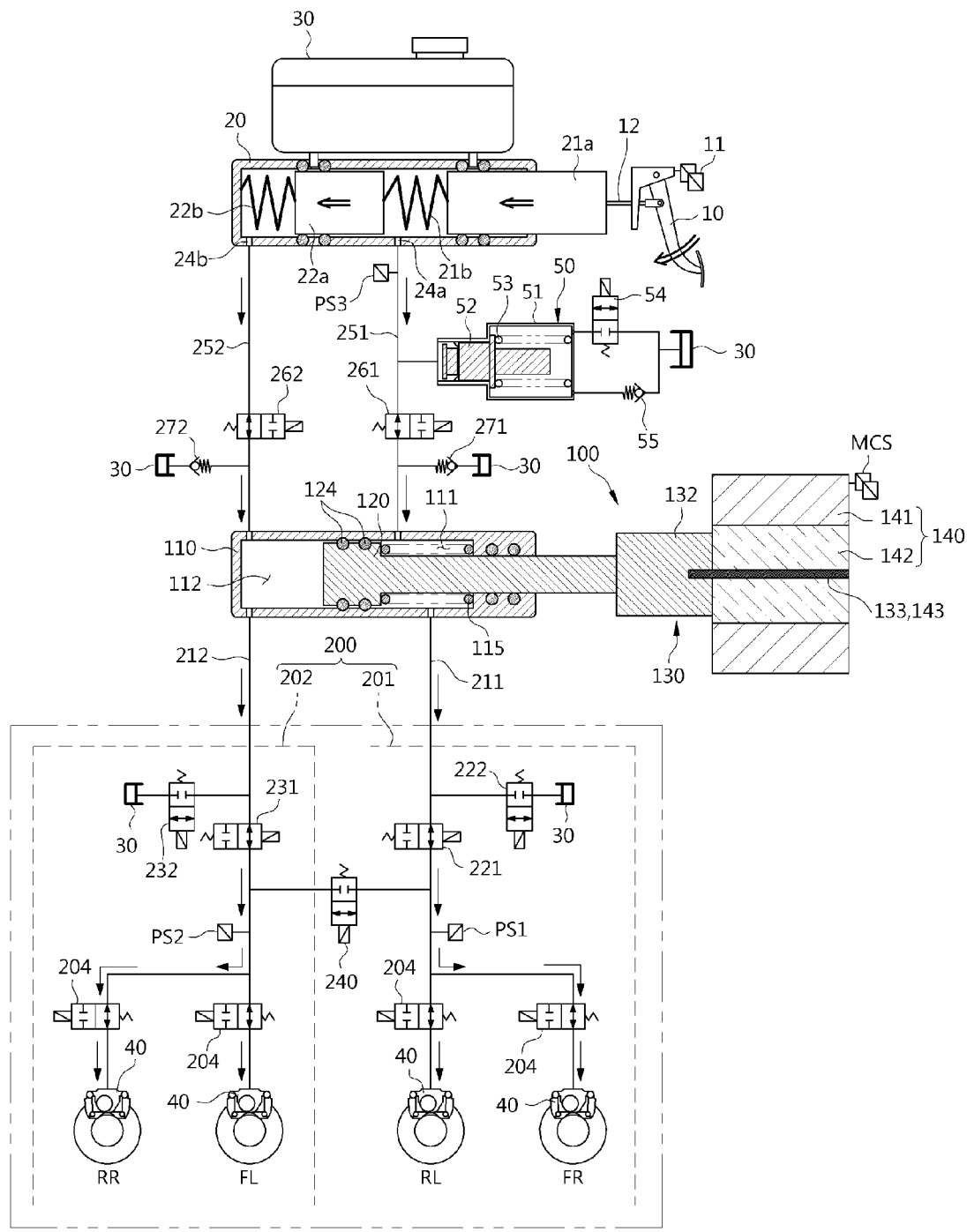
FIG. 6 is a hydraulic circuit view illustrating an abnormal operation state of the electric brake system according to an embodiment of the present invention.

If the above-mentioned electric brake system abnormally operates, the following operations can be carried out, and a detailed description thereof will hereinafter be described with reference to FIG. 6. Referring to FIG. 6, if the electric brake system abnormally operates, respective valves (54, 204, 221, 222, 231, 232, 240, 261, 262) are provided at the initial stage of braking. If the driver steps on or depresses the brake pedal 10, the input rod 12 connected to the brake pedal 10 moves left, and at the same time the first piston 21a contacting the input rod 12 and the second piston 22a also move left. In this case, there is no gap between the input rod 12 and the first piston 21a, such that rapid braking can be carried out. That is, hydraulic pressure generated by the pressurized master cylinder 20 is transferred to the caliper brake 40 through the first and second backup passages (251, 252) connected for backup braking, resulting in formation of brake force. In this case, the first and second cut valves (261, 262) disposed in the first and second backup passages (251, 252), the first and second switching valves (221, 231) disposed in the first and second hydraulic passages (211, 212), and the inlet valve 204 located upstream of each wheel (RR, RL, FR, FL) may be implemented as the normally opened (NO) solenoid valves. The simulation valve 54, the first and second dump valves (222, 232), and the balance valve 240 are implemented as the normally closed (NC) solenoid valve, such that hydraulic pressure can be applied to the caliper brake 40. That is, hydraulic pressure generated from the master cylinder 20 is transferred to the caliper brake 40 disposed in respective hydraulic circuits (201, 202) through the first and second hydraulic chambers (111, 112). As a result, although the system abnormally operates, stable braking can be carried out, resulting in increased stability of braking.

As described above, the first and second backup passages (251, 252) are connected to the first and second hydraulic chambers (111, 112) of the hydraulic-pressure supply device 100, such that passages for implementing the electric brake system can be simplified in design, resulting in simplification of the system structure.

Meanwhile, the first and second hydraulic chambers (111, 112) have different regions. Upon receiving hydraulic pressure from the first backup passage 251 and the second backup passage 252, a pressure difference between the first hydraulic chamber 11 and the second hydraulic chamber 112 may occur. That is, the double-acting piston 120 disposed in the hydraulic cylinder 110 starts motion by a pressure difference between the first hydraulic chamber 111 and the second hydraulic chamber 112. Thereby, the elastic member 115 is arranged in the first hydraulic chamber 111 to elastically support the double-acting piston 120, such that the double-acting piston 120 can return to an original position thereof.

As is apparent from the above description, the electric brake system according to the embodiments allows hydraulic pressure generated from a hydraulic-pressure supply device to operate in a double-acting manner, such that it can generate hydraulic pressure when a piston moves forward and backward. As a result, when pressure is regenerated and boosted, the electric brake system can quickly regenerate and boost pressure as compared to the conventional art in which the pressurized piston returns to an original position and is then re-pressurized.

In addition, the electric brake system according to the embodiments includes a minimum number of valves configured to control flow of hydraulic pressure, such that it is more simplified than the conventional art. As a result, the size of the brake system (i.e., the size of a modulator block in which valves are installed) can be reduced, resulting in reduction of production costs.

In addition, the electric brake system according to the embodiments controls a motor to interact with a plurality of valves, resulting in implementation of precise pressure control. In addition, two hydraulic circuits of the electric brake system are configured to respectively connect to two wheels such that each hydraulic circuit is controlled independently, and the hydraulic-pressure supply device is controlled according to logic for deciding pressure and priority needed for each wheel, resulting in an increased control range.

Moreover, during malfunction of the brake system, the electric brake system allows foot force of a vehicle driver to be directly applied to a master cylinder so as to perform braking of a vehicle, thereby providing stable brake force.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electric brake system comprising:
   a reservoir configured to store oil;
   a master cylinder having first and second hydraulic ports, connected to the reservoir to receive oil from the reservoir;
   a simulation device connected not only to a pedal displacement sensor sensing a displacement of a brake pedal, but also to the master cylinder, configured to provide reaction force in response to foot force applied to the brake pedal;
   a hydraulic-pressure supply device configured to convert rotational force of a motor into rectilinear motion upon receiving an electric signal from the pedal displacement sensor according to operation of the brake pedal, and move a double-acting piston designed to perform reciprocating motion within a hydraulic cylinder,
   wherein the double-acting piston moves in one direction to generate hydraulic pressure by pressing a first hydraulic chamber provided in one end thereof, and moves in another direction to generate hydraulic pressure by pressing a second hydraulic chamber provided in the other end thereof;
   a hydraulic-pressure control unit including a first hydraulic circuit connected to the first hydraulic chamber via a first hydraulic passage, and a second hydraulic circuit connected to the second hydraulic chamber via a second hydraulic passage, configured to control flow of hydraulic pressure applied to a caliper brake installed in each wheel via a plurality of valves disposed in the first and second hydraulic circuits;
   a first backup passage configured to connect the first hydraulic port to the first hydraulic chamber;
   a second backup passage configured to connect the second hydraulic port to the second hydraulic chamber;
   a first cut valve disposed in the first backup passage, configured to control flow of hydraulic pressure;
   a second cut valve disposed in the second backup passage, configured to control flow of hydraulic pressure; and
   an electronic control unit (ECU) configured to control the motor and one or more valves on the basis of hydraulic pressure information and pedal displacement information.

2. The electric brake system according to claim 1, wherein:
   the first hydraulic circuit includes a first switching valve disposed in the first hydraulic passage, and a first dump valve disposed in a passage through which the first hydraulic passage is connected to a reservoir; and
   the second hydraulic circuit includes a second switching valve disposed in the second hydraulic passage, and a second dump valve disposed in a passage through which the second hydraulic passage is connected to a reservoir.

3. The electric brake system according to claim 2, wherein:
   the first and second dump valves are respectively connected to the first and second hydraulic chambers, are selectively opened or closed according to forward or backward movement of the double-acting piston, suction oil from the reservoir, allow the first hydraulic chamber or the second hydraulic chamber to be filled with the suctioned oil, and discharge the oil of the first hydraulic chamber or the second hydraulic chamber to a reservoir.

4. The electric brake system according to claim 2, wherein the first and second switching valves are implemented as normally opened (NO) solenoid valves that remain opened in a normal state and then closed upon receiving a closing signal.

5. The electric brake system according to claim 2, wherein the first and second dump valves are implemented as normally closed (NC) solenoid valves that remain closed in a normal state and then opened upon receiving a closing signal.

6. The electric brake system according to claim 2, wherein:
   the hydraulic-pressure control unit further includes a balance valve disposed between the first and second hydraulic circuits such that the two hydraulic circuits are connected to each other or are disconnected from each other; and
   one end of a passage in which the balance valve is disposed is connected to downstream of the first switching valve and the first dump valve, and the other end of the passage is connected to downstream of the second dump valve.

7. The electric brake system according to claim 6, wherein the balance valve is implemented as a normally closed (NC) solenoid valve that remains closed in a normal state and then opened upon receiving an opening signal.

8. The electric brake system according to claim 2, wherein the hydraulic control unit further includes:

a normally opened (NO) inlet valve disposed upstream of the caliper brake such that hydraulic pressure transmission to the caliper brake is controlled.

9. The electric brake system according to claim 1, wherein the first and second cut valves are implemented as normally opened (NO) solenoid valves that remain opened in a normal state and then closed upon receiving a closing signal from the electronic control unit (ECU).

10. The electric brake system according to claim 1, wherein:
the first hydraulic chamber and the second hydraulic chamber have different-sized hydraulic regions, and an elastic member is configured to elastically support the double-acting piston in one of the first and second hydraulic chambers having a relatively smaller-sized hydraulic region.

* * * * *